United States Patent [19]
Fujimoto et al.

[11] Patent Number: 6,052,970
[45] Date of Patent: Apr. 25, 2000

[54] TUBE MOLDING METHOD AND DEVICE, AND PACKAGING CONTAINER PRODUCING APPARATUS

[75] Inventors: Akimasa Fujimoto; Hiroshi Katayama; Hidekimi Yamamoto, all of Tokushima-ken, Japan

[73] Assignee: Shikoku Kakoki Co., Ltd., Tokushima-ken, Japan

[21] Appl. No.: 09/144,742

[22] Filed: Sep. 1, 1998

[30] Foreign Application Priority Data

Sep. 19, 1997 [JP] Japan .................................. 9-255186

[51] Int. Cl.$^7$ ........................................................ B65B 9/06
[52] U.S. Cl. ............................... 53/451; 53/551; 53/567; 493/271; 493/302; 493/476; 493/478
[58] Field of Search ............................... 53/451, 551, 576, 53/578, 567; 493/302, 271, 475, 476, 478

[56] References Cited

U.S. PATENT DOCUMENTS

| | | | |
|---|---|---|---|
| 4,848,063 | 7/1989 | Niske | 53/451 |
| 5,067,311 | 11/1991 | Andersson | 53/551 |
| 5,767,491 | 6/1998 | Ohlsson | 53/551 |
| 5,813,964 | 9/1998 | Motomura | 493/302 |

*Primary Examiner*—John Sipos
*Attorney, Agent, or Firm*—Dike, Bronstein, Roberts & Cushman, LLP; David G. Conlin

[57] ABSTRACT

The invention is to provide a method and a device, etc. for molding tubes, free from any fear of the web being broken, which do not generate any wrinkle on a web when molding a plate-like web to rectangular parallelpiped packaging containers via a tubular web. In a tube molding method of the invention for molding a plate-like web to a tubular web while transferring the former along the roller surface formed by a plurality of rollers 11 through 13 of the molding roller 4, a roller supporting plate 16 is turned by a tightening member 29 while being position-regulated by a roller 25 attached to the roller attaching arm 23 so that web is transferred on the basis of the hypothetical center axis line (Point X) of the tubular web, which is formed by the roller surface constituted by the rollers 11 through 13, wherein the web in the lengthwise direction can be accurately transferred so that the same web takes a predetermined orientation of the rollers 11 through 13. As a result, it is possible to produce a high molding accuracy, for which the creasing lines of web in the lengthwise direction are made coincident with ridges of square-post-like web in its lengthwise direction when molding the square-post-like web from the tubular web.

8 Claims, 15 Drawing Sheets

(a)

(b)

(a)

(b)

(a)

(b)

(a)

(b)

(a)

(b)

(a)

(b)

TUBE MOLDING METHOD AND DEVICE, AND PACKAGING CONTAINER PRODUCING APPARATUS

Tube molding method and device, and packaging container producing apparatus

FIELD OF THE INVENTION

The present invention relates to a packaging container producing apparatus, and in particular relates to a tube molding device and method for molding a plate-like web to a tubular web and filling contents such as fluid foods into said tubular web, and a packaging container producing apparatus provided with said tube molding device.

As a packaging container producing apparatus for producing packaging containers into which a content is internally filled, from a plate-like web molds a tubular web from a plate-like web wound like a coil, such a packaging container producing machine has been publicly known, which seals both ends overlapped in the lengthwise direction of said tubular web (hereinafter referred to as "longitudinal sealing"), fills a content such as a fluid food therein, next seals the tubular tube along the direction orthogonal to the lengthwise direction equivalent to the length of a container (hereinafter referred to as "cross sealing") and cuts it off, whereby a pack-like packaging container in which a content is filled is produced.

In the abovementioned packaging container producing machine, as shown in FIG. 12, there is such a tube molding device, in which a tubular web W is molded by gradually deforming a plate-like web W to be cylindrical by an upper stage molding roller 104, an intermediate stage molding roller 105 and a lower stage molding roller 106 via a bending roller 102 from a guide roller 101 having a rotating axis pivotally supported in the horizontal direction at a part of the packaging container producing machine body (not illustrated), and thereafter a square-post-like web W.

However, in order to improve the moldability when molding a square-post-like web W from a tubular web W, creasing lines are given, in advance, to the plate-like web W in the lengthwise direction. If the plate-like web W to which such creasing lines are given is accurately transferred so as to secure a predetermined orientation while passing through each of the abovementioned molding rollers 104 through 106, the creasing lines of web W in the lengthwise direction are made coincident with ridges of a square-post-like web W in the lengthwise direction when being molded to the square-post-like web W, whereby product containers having high molding accuracy. However, if accurate transfer is not carried out, the ridges of the molded square-post-like web W in the lengthwise direction are not made coincident with the crease lines of web W in the lengthwise direction, thereby causing a parallel positional relationship to occur, and product containers having a worse moldability are produced.

Therefore, it is always monitored whether or not the web W is accurately transferred with the predetermined orientation. If it not accurately transferred, the positions of the respective molding rollers are adjusted so as to cause the web W to be accurately transferred with an appointed orientation.

Furthermore, usually, since the longitudinal sealing position comes to the center of a container, and in this case the abovementioned creasing lines in the lengthwise direction are set in advance so as to become coincident with the ridges of the square-post-like web W in the lengthwise direction if the web W is accurately transferred with the predetermined orientation, it is easily understood from the following measures whether or not the web W is being accurately transferred with the predetermined orientation.

The tubular web W in which a content is filled is sealed in the direction orthogonal to the transferring direction by a pair of jaws 109 (only one of the jaws is illustrated in FIG. 12), is cut off one after another and is molded to a pillow-like packaging container C. Two pillow-like packaging containers C are continuously taken out, wherein the ceiling surfaces or the bottom surfaces of the pillow-like packaging containers C are caused to overlap with the same surfaces facing each other, and it is checked whether or not the longitudinal sealing positions of the two containers C slips in the direction orthogonal to the transferring direction of web W at the overlapped portion.

As a result of the checking, if they slip, it means that the longitudinal sealing position at the tubular web W slips in parallel to the transferring direction from the predetermined position. If they do not slip, it is understood that the web W is accurately transferred with the predetermined orientation. If they slip, it is necessary to correct the orientation of the tubular web W being transferred, equivalent to the length corresponding to a half of the slip length in the direction orthogonal to the transferring direction. For example, by adjusting the upper stage molding roller 104, the web W has been adjusted so as to secure the predetermined orientation.

Conventionally, the work for correcting the orientation on a plane orthogonal to the transferring direction of web by the abovementioned molding roller 104 (hereinafter referred to as "tube center alignment") used the rotation center 110a of a supporting plate 110, at which all the rollers constituting the upper stage molding roller were mounted, as the reference axis. That is, the rotation center 110a located outside the semi-opened tubular web W was used as the reference axis, wherein the correction was carried out by causing the supporting plate 110 to rotate in the horizontal direction by a screw 112 and a butterfly nut 113 via the wall plane 111 of the packaging container producing apparatus body.

However, with the conventional method as described above, the rotation center located outside the semi-opened tubular web W is used as the reference axis and the supporting plate 110, at which all the rollers constituting the upper stage molding roller are mounted, are caused to rotate to carry out a tube center alignment, the hypothetical center axis of the semi-opened tubular web W is moved, load (arrow b) is applied into the direction orthogonal to the lengthwise direction of the web W by a force (arrow a) which the roller 104 operates on the web W as shown in FIG. 14, thereby causing the web W to be broken. It is considered that this results from that the distance of the web W from the roller 104 to the sealing portion by a pair of jaws 109 in the lengthwise direction becomes longer in line with movements of the hypothetical center axis, and that as shown in FIG. 14 (Enlarged view of circle A in FIG. 14), great load (arrow c) which is attempted to widen outside in the process of molding the plate-like web W to a tubular web W is applied to the end portion in the direction orthogonal to the lengthwise direction of web W.

Furthermore, as shown in FIG. 12, since the width of the plate-like web W is shorter than the width (length in the rotating axis direction) of the bending roller 102, heavy load which accompanies forcible and unreasonable deformation of the web W is given to the end of the web W which is just molded to be tubular and which has immediately passed through the bending roller 102, and in the abovementioned conventional tube center alignment, the end of the web W to which such heavy load is given will be further pressed by the molding roller 104, wherein in some cases the web W may be broken at this portion as described above, or wrinkles are caused at the web W. These will result in defective molding of the packaging containers C being the final products.

SUMMARY OF THE INVENTION

Therefore, it is an object of the invention to provide a method and device for molding tubes, and a packaging container producing apparatus equipped with the abovementioned tube molding device, by which products of high molding accuracy are produced by giving a reasonable friction to a web in the feeding direction when continuously molding a plate-like web to a tubular web and decreasing as much as possible an unnecessary force given to a web gradually being molded, and simultaneously no unnecessary wrinkles are generated on the web, and which do not constitute any possibility of breaking the web.

In order to solve the abovementioned object, the inventors positively researched a method for changing only the orientation of the semi-opened tubular web by molding rollers without moving the web in the horizontal direction and reached the point that the hypothetical center located inside the semi-opened tubular web is used as the reference axis without using the rotation center located outside the semi-opened tubular web as the reference axis, wherein they found that when the molding rollers are adjusted while using the hypothetical center located inside the semi-opened tubular web, that is, the hypothetical center of tubular webs formed along the roller face formed by the molding rollers, the web can be accurately transferred with the predetermined orientation in a state where no load is given to the web, and the inventors arrived at the invention.

That is, the present invention provides a tube molding method for molding a plate-like web to a tubular web while transferring the plate-like web along a roller surface formed by a molding roller consisting of a plurality of rollers, and for filling a fluid content into said tubular web, wherein the passing position of the molding roller of a web is adjusted to the direction orthogonal to a web feeding direction centering around the hypothetical center axis line of said tubular web which is formed along the roller surface formed by the molding roller.

And the invention provides a tube molding device for molding a plate-like web to a tubular web while transferring the plate-like web along a roller surface formed by a molding roller consisting of a plurality of rollers, and for filling a fluid content into said tubular web, comprising a means for adjusting the passing position of the molding roller of web being transferred, to the direction orthogonal to a web feeding direction centering around the hypothetical center axis line of said tubular web which is formed along the roller surface formed by the molding roller.

Furthermore, the means for adjusting the passing position of the web molding roller in the abovementioned tube molding device according to the invention may be constructed of a supporting member which supports the molding roller, and an adjusting member, connected to said supporting member and supported at the tube molding device body which moves and adjusts the disposing position of the supporting member centering around the hypothetical center axis line of the tubular web.

Furthermore, in the invention, the means for adjusting the passing position of the molding roller of web is provided at at least any one of stages of molding rollers which are secured in plural stages in the transferring direction of web.

Since the abovementioned means for adjusting the passing position of the web molding rollers is usually provided at a molding roller as apart as possible from the lower stage molding roller which completely molds to be tubular, when observed in the web transferring direction, the adjustment of the roller passing position can be carried out without any difficulty with respect to a flow of the semi-opened tubular web.

Furthermore, the invention may be constructed so that a means for adjusting the passing position of molding rollers is provided at the extreme upstream stage molding roller in the web transferring direction among the molding rollers secured in plural stages, the molding roller at the intermediate portion consists of a plurality of molding rollers, an opening (for example, a hollow portion 45 in FIG. 6) for permitting the web to pass therethrough, which is formed by the respective roller surfaces of the abovementioned plurality of molding rollers, is secured at the molding roller at the intermediate portion, a structural member (for example, roller supporting plates 39, 40 in FIG. 6) of the abovementioned opening is made openable and closable to take out a filling pipe to fill fluid contents into a web made tubular, and a pair of rollers are provided at the extreme downstream stage molding roller, which put the tubular web being transferred, therebetween and seals the same while being pressed.

Since the tubular web is not completely cylindrical between the extreme upstream stage molding roller and the intermediate molding roller, a filling pipe for filling a fluid content is inserted into the tubular web in a state where the web is semi-opened, and an opening of the filling pipe is provided at the stage side coming after the extreme downstream stage molding roller. Therefore, by making the opening of the intermediate stage molding roller openable and closable, it is possible to take out the filling pipe outside of the tube device.

Furthermore, the intermediate molding roller is not of a single stage but may be constructed for a plurality of stages.

Furthermore, if the intermediate molding roller is constructed so as to form a roller surface for regulating the transfer position of a web so that both ends of the tubular web in the direction orthogonal to the web transferring direction (width direction) are caused to overlap, it is possible to seal the tubular web by a method in which the overlapped portion of the abovementioned tubular web at both ends in the width direction thereof is put between a pair of rollers and is pressed at the extreme downstream stage molding roller.

A pair of rollers which puts a tubular web being transferred by the abovementioned extreme downstream stage molding roller therebetween and presses it may consist of a roller for pressing a web, which is a resilient member disposed inside the tubular web being transferred, and a roller, disposed outside the tubular web, which presses the web by a pressing means.

Since the overlapping portion of web at both ends in the width direction thereof is completely welded, (1) the diameter of a tubular web, (2) a complete sealing property of a seal tape, adhered to the abovementioned overlapping portion, which is used to prevent a filling liquid content in the web from oozing in, and (3) the passing position of a creasing line predetermined on the web in the web transferring direction (=the lengthwise direction of web) are determined at the extreme downstream stage molding roller.

If as an influence of the abovementioned (1) the positional relationship between the tubular web and component elements operating with respect to a filling work of fluid contents into a web in the subsequent processes is changed, a shortage or an excess occurs in the filling quantity of the liquid content. Furthermore, if as an influence of the abovementioned (2) the welding condition of the seal tape is not satisfactory, the quality of the content filled in a packaging container will be worsened. Furthermore, if as an influence of the abovementioned (3) the engagement between the molding device for making a rectangular parallelepiped shape being the final parallelpiped and the creasing lines is lost, the molding becomes defective.

Therefore, it is recommended that the extreme downstream stage molding roller is provided with a means for moving and adjusting the disposing position thereof in any direction of the three directions consisting of the transferring direction of a tubular web being transferred and two directions orthogonal to each other on the plane orthogonal to the transferring direction of the tubular web being transferred.

By employing such a structure by which the disposing position of the extreme downstream stage molding roller can be moved and adjusted in any direction of the three directions, the engaging position of the compressing roller and pressure receiving roller is optimized, it is possible to prevent defective molding of parallelpiped packaging containers being the final products, a shortage or an excess of the filling quantity of fluid contents, and a worsening of the quality of the content filled in packaging containers.

Furthermore, the abovementioned objects of the invention can be solved by the following construction.

That is, a bending roller which changes the transferring direction of a plate-like web to the direction for molding a tubular web is provided at the front stage side of the molding rollers in the web transferring direction in a tube molding device having any one of the abovementioned molding roller structures, and the length of the abovementioned bending roller in the rotating axis direction is made shorter than the length of the web in the direction orthogonal to the web transferring direction.

Herein, if the length of the bending roller in the rotating axis direction is made shorter than the length (web width) of web in the direction orthogonal to the web transferring direction, it is possible to decrease or lighten the load (tension) given to both end portions of a web in the width direction in the process of molding a plate-like web to a tubular web, and also possible to prevent wrinkles thereof from being generated at the end portions and to prevent the web from being broken. At this time, if a round portion is given at both end portions of the bending roller, the effect of preventing the wrinkles and breakage can be further improved.

The invention includes the abovementioned tube molding device and a packaging container producing apparatus equipped with a structure of producing parallelpiped packaging containers from the molded tubes.

BRIEF DESCRIPTION OF THE DRAWINGS

FIG. 14 is a view explaining an adjusting mechanism of the installation position of the upper stage molding roller according to prior arts, wherein FIG. 14(a) is an exemplary view of a force acting on the web, and FIG. 14(b) is an enlarged view of the circle A position in FIG. 14(a), and FIG. 15 is a view explaining an adjusting mechanism of the installation position of the upper stage molding roller according to prior arts, wherein FIG. 15(a) is a plan view, and FIG. 15(b) is an exemplary view of a force acting on the web).

DETAILED DESCRIPTION OF THE PREFERRED EMBODIMENTS OF THE INVENTION

A description is given of the preferred embodiments of the invention.

Figure 1:
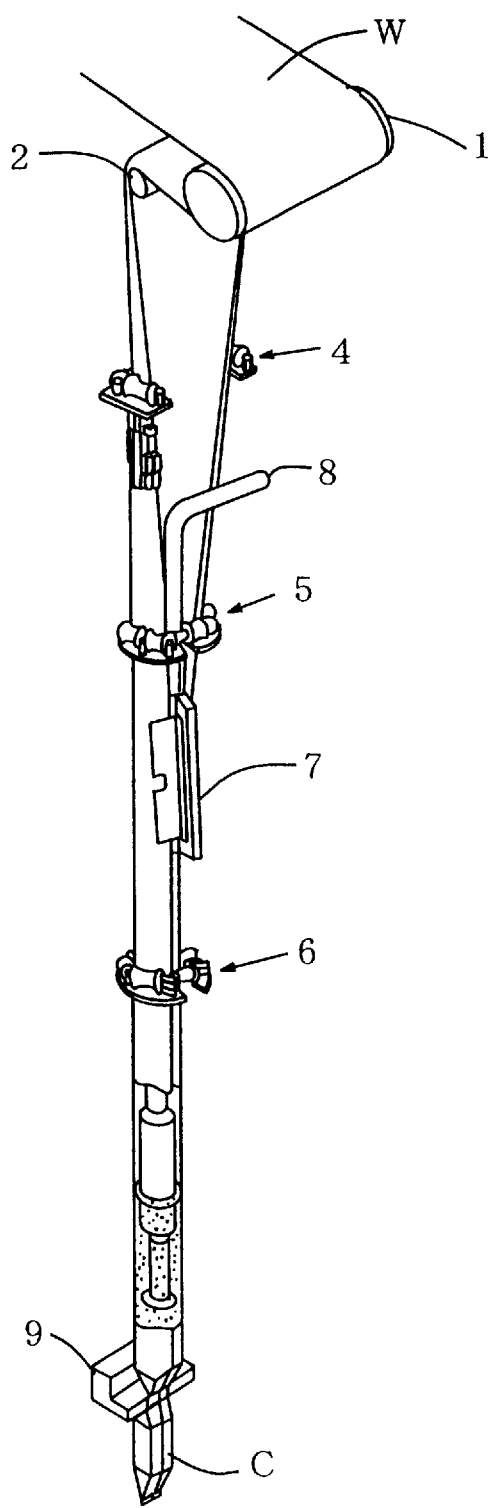
FIG. 1 is a perspective view of a tube molding device of a packaging container producing apparatus used in one preferred embodiment of the invention.

FIG. 1 shows a part of a packaging container producing apparatus used in a preferred embodiment of the invention, which is a view showing a tube molding device which is in charge of a process for molding a plate-like tube W to a tubular web W.

In a tube molding device according to the present preferred embodiment, a plate-like web W being transferred from a winding roller of a packaging container producing apparatus (not illustrated) reverses its transferring direction via a guide roller 1, and next is gradually molded to be tubular by the upper stage molding roller 4, intermediate stage molding roller 5 and lower stage molding roller 6, which are disposed with space in the perpendicular direction via the bending roller 2, wherein the obtained tubular web W is further deformed to a square-post-like web. After the square-post-like web is sealed one by one corresponding to a packaging container, they are cut off, wherein parallelpiped packaging containers C are finally molded.

In the tube molding process, the overlapping portion in the web transferring direction is sealed (longitudinally sealed) to produce a tubular web W, and in order to produce parallelpiped packaging containers C from the abovementioned tubular web W, the tubular web W is deformed to a square-post-like web W, and further the web W is pressed by a pair of sealing jaws 9 (only one of the jaws is illustrated in FIG. 1) from both sides of the web W in the direction orthogonal to the web streaming direction, thereby forming a sealing portion (cross sealing) at the web W, wherein a content such as a fluid food is filled into the tubular web W through a filling pipe 8 upwards of the abovementioned sealing portion.

Furthermore, a longitudinally sealing heater nozzle 7 shown in FIG. 1 is to heat the overlapping portion of the tubular web W and the portion where the seal tape is welded, and in subsequent processes, the sealing is carried out by a pair of compressing rollers.

Figure 2:
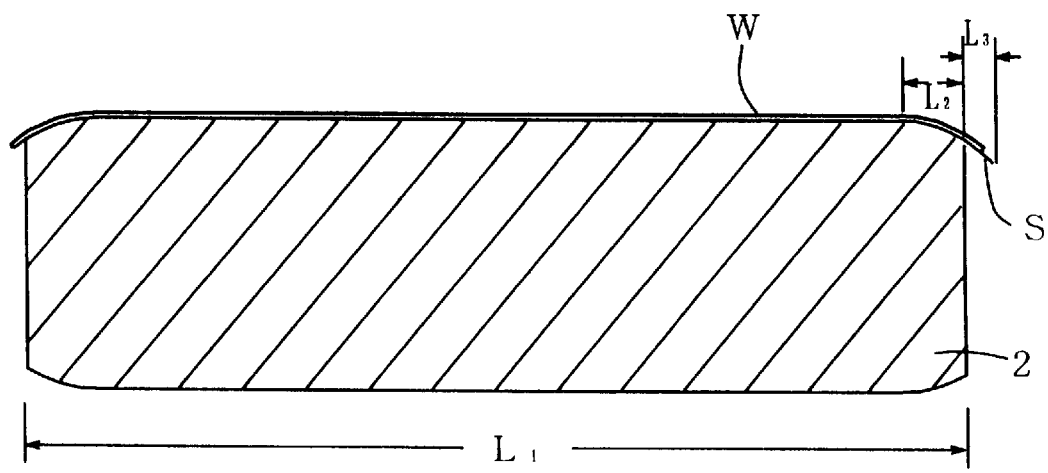
FIG. 2 is a longitudinally sectional view taken along the center axis of a bending roller in FIG. 1.
Figure 3:
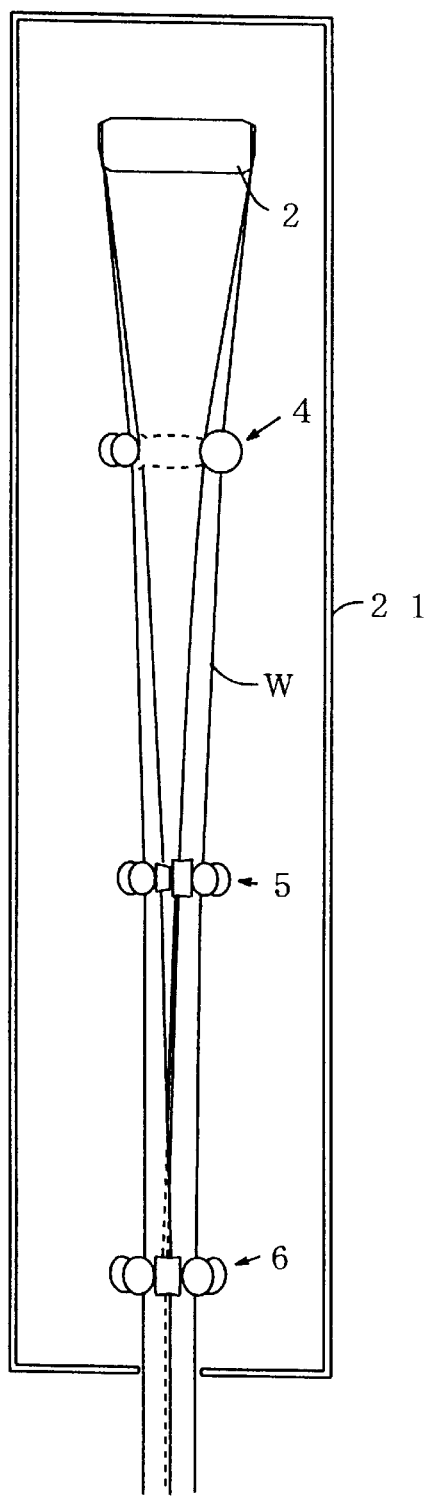
FIG. 3 is a view showing a molding process of web, where it is shown that a plate-like web is molded to a tubular web by using the bending roller shown in FIG. 2 and the three-stage molding rollers at the downstream side in the stream of the web.

FIG. 2 shows a longitudinally sectional view cut out along the center axis of the bending roller 2, and FIG. 3 is a view showing a state where the plate-like tube W is molded to a tubular web W by the three stage molding rollers 4 through 6 at the downstream side in the stream of the web W, using the bending roller 2 shown in FIG. 2.

As shown in FIG. 2, the width of the bending roller 2 is made smaller than the width of the plate-like web W, a rounded portion is provided at both ends of the bending roller 2, and the roller 2 is tapered to its tip end. Furthermore, a seal tape S, which prevents a filled content from oozing from the end face of the web located inside the overlapping portion of the tubular web W into the web and improves the barrier effect with respect to the atmosphere, is adhered in advance to one end of the web W.

Since the length of the bending roller 2 in the rotating axis direction is made shorter than the web length in the direction (hereinafter may be called "width direction") orthogonal to the lengthwise direction (=transferring direction) of the web W, and a rounded portion is provided at both ends of the bending roller 2, a smooth molding can be carried out in a process of molding a plate-like web W to a tubular web W.

Furthermore, since the end portions of the web W protrude from both ends of the bending roller 2, the seal tape S is not brought into contact with the roller 2. Therefore, there is no worry about generation of unexpected twisting.

Next, a detailed description is given of a mechanism for molding a tubular web W from a plate-like web by molding rollers 4 through 6 consisting of three stages.

Firstly, both ends of the plate-like web W in the width direction are deformed so as to be rounded by the upper stage molding roller 4, and the plate-like web W, both ends of which are rounded, are further deformed to make a tubular web W by the intermediate stage molding roller 5. Furthermore, the web W is deformed so that both end portions of the web W are caused to overlap. Next, the overlapping portion at both end portions of the tubular web W is pressed from both sides so as to perform a longitudinal sealing by the lower stage molding roller 6, thereby causing a longitudinal sealing to be carried out.

Figure 4:
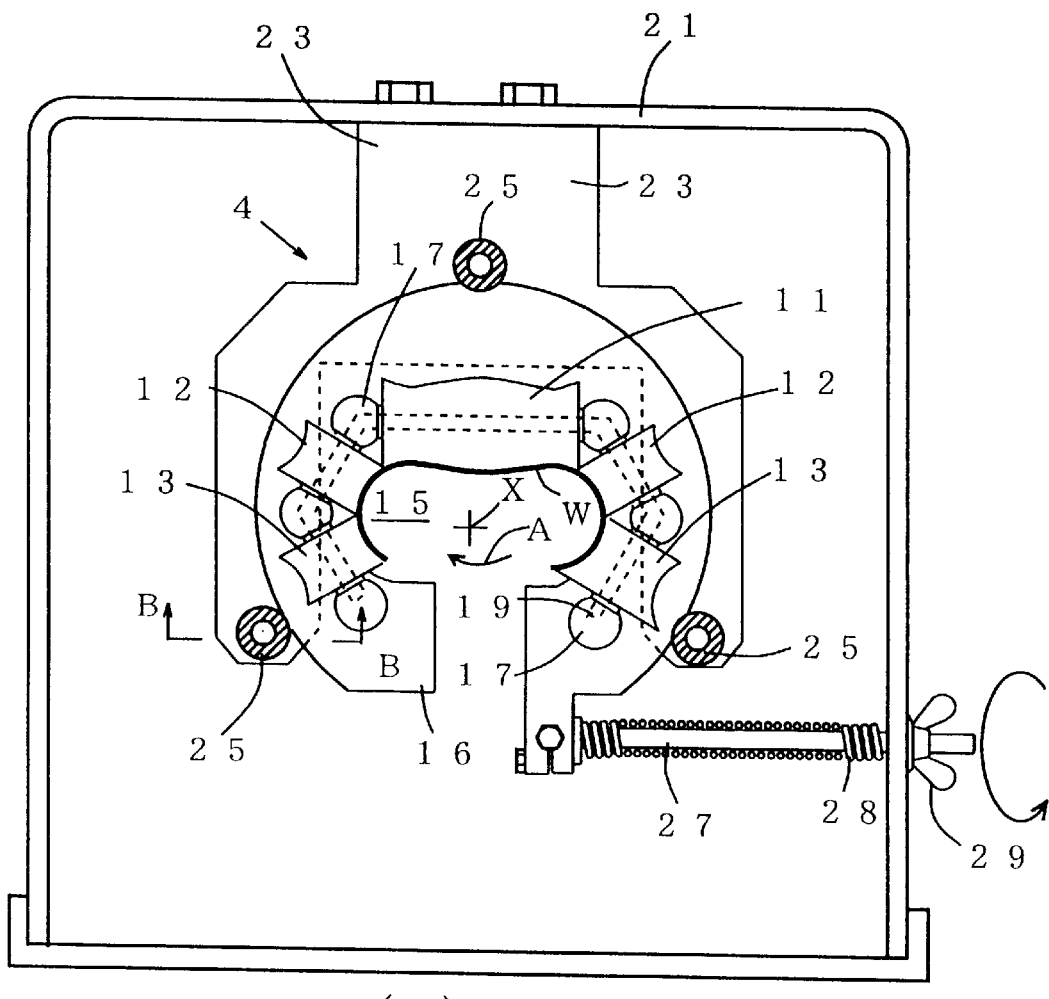
FIGS. 4 are a plan view (FIG. 4(a)) of the upper stage molding roller in FIG. 1 and is a cross-sectional view (FIG. 4(b)) taken along the line B—B in FIG. 4(a)
Figure 4:
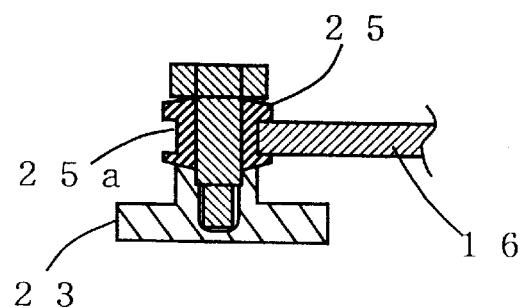
Figure 5:
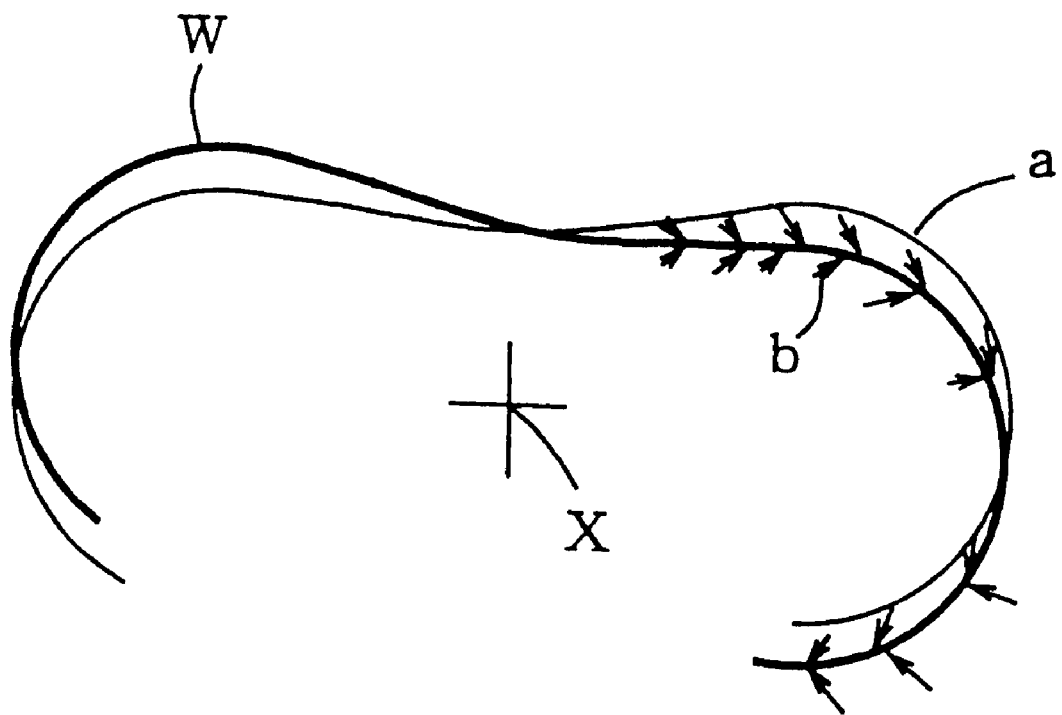
FIG. 5 is a exemplary view explaining a force acting on a web W when the upper stage molding roller in FIG. 1 is used.

FIG. 4(a) shows a plan view of the upper stage molding roller 4. The upper stage molding roller 4 comprises a roller group consisting of five rollers which are an intermediate barrel type drum roller 11 and two pairs of drum rollers 12, 13 secured at both sides of the roller 4. Since the roller group is disposed so that roller surface formed by the abovementioned five rollers is brought into contact with the outer surface of the plate-like web W being transferred from the bending roller 2, it is possible to mold both ends of the plate-like web W in the width direction so that they are made round.

Five rollers 11, 12, 12, 13, 13 are rotatably supported at the respective roller rotation axes 19, both ends of which are supported at the rotating axis supporting portion 17 secured on the roller supporting plate 16 having a hollow portion 15 through which the web W passes. Furthermore, the roller supporting plate 16 is disposed on an attaching arm 23 so that the outer side face of the roller supporting plate 16 is brought into contact with three rollers 25 secured on a roughly channel-shaped attaching arm 23 supported at the wall plane 21 of a packaging container producing apparatus body. Three rollers 25 on the attaching arm 23 are disposed at points between which an angle of roughly 120 degrees is formed. As shown in FIG. 4(b) (Cross-sectional view taken along the line B—B in FIG. 4(a)), since the outer end portion of the roller supporting plate 16 is brought into contact with the groove 25a of the roller 25, the disposing position of the roller supporting plate 16 is regulated.

Furthermore, a connection rod 27 linked to one end of the roller supporting plate 16 is provided so as to pass through the wall plane 21 of a packaging container producing apparatus body, and since a coil spring 28 attached to the abovementioned connection rod 27 operates from both sides of the wall plane 21, the adjusting position of the roller supporting plate 16 is determined. Therefore, such a structure is employed, in which the roller supporting plate 16 is able to rotate in the horizontal direction while its rotation direction is being regulated by the three rollers 25 in line with rotations of the tightening member 29. Since the roller supporting plate 16 is designed in advance so that its rotation is carried out centering around the hypothetical center point (Point X in FIG. 4) of the tubular web W, it is possible to easily align the tube center of the tubular web W.

Figure 13:
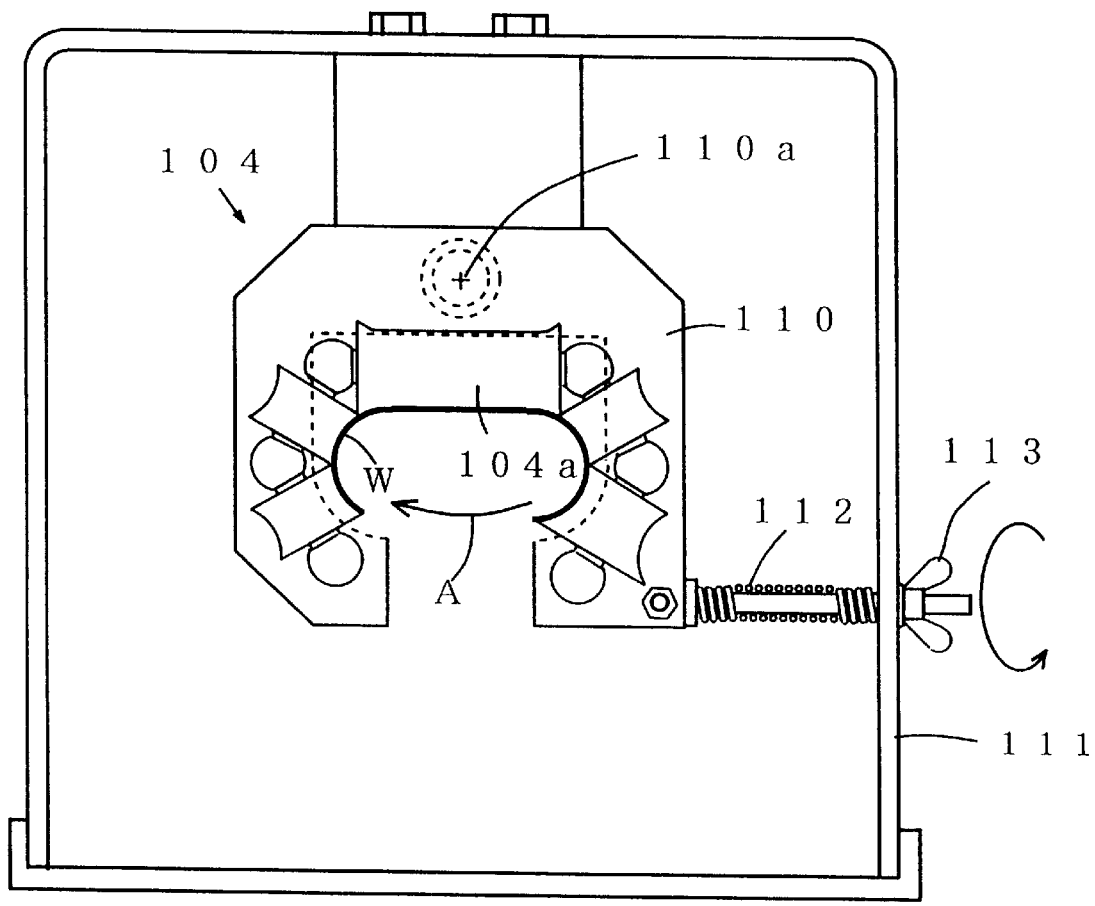
FIG. 13 is a plan view explaining an adjusting mechanism of the installation position of the upper stage molding roller according to prior arts.
Figure 14:
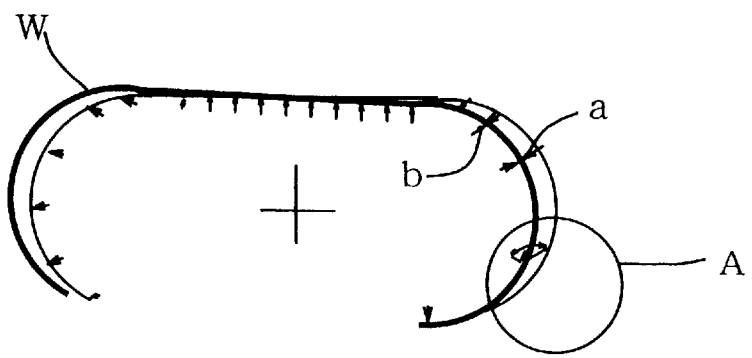
Figure 14:
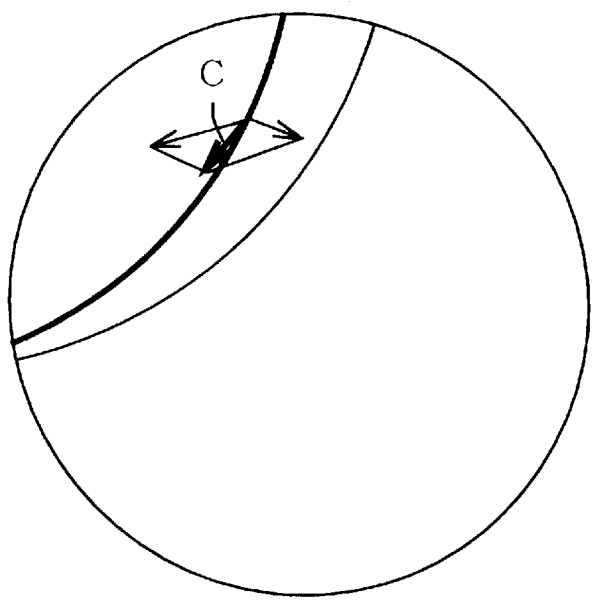
Figure 15:
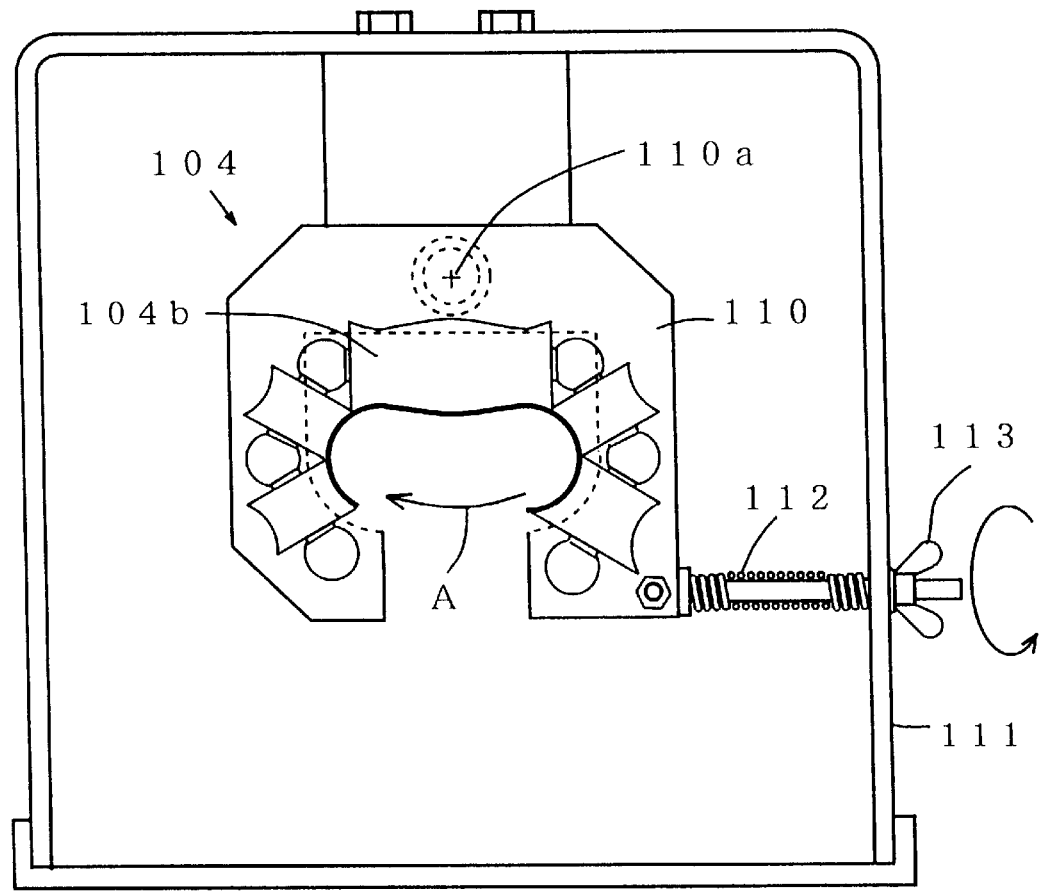
Figure 15:
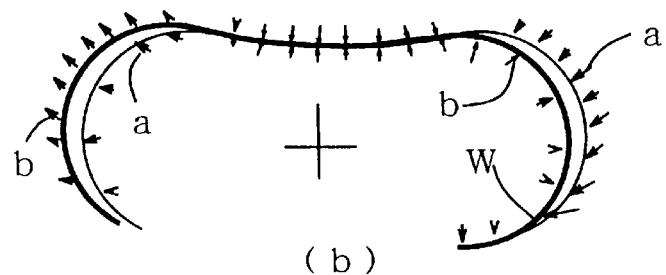

Furthermore, in comparison with a case where, using an almost cylindrical roller 104a shown in FIG. 13 or a barrel type drum roller 104b shown in FIG. 15, the position of the roller supporting plate 110, that is, the molding roller 104, in its horizontal direction is adjusted by a connection rod 112 and a tightening member 113, the roller supporting plate 16 is able to rotate centering around the hypothetical center point (Point X in FIG. 4) of the tubular web even though the roller supporting plate 16 is moved in the direction of the arrow A by using the barrel type drum roller 11 according to the preferred embodiment when carrying out the tube center alignment. Therefore, in comparison with the conventional examples shown in FIG. 13 and FIG. 15, the load (arrow b) given to the web W, which is produced by the web W being attempted to widen outward in the width direction, can be almost uniformly dispersed in the entire width direction of the web W. Therefore, there is no fear that the web W is interrupted.

Figure 6:
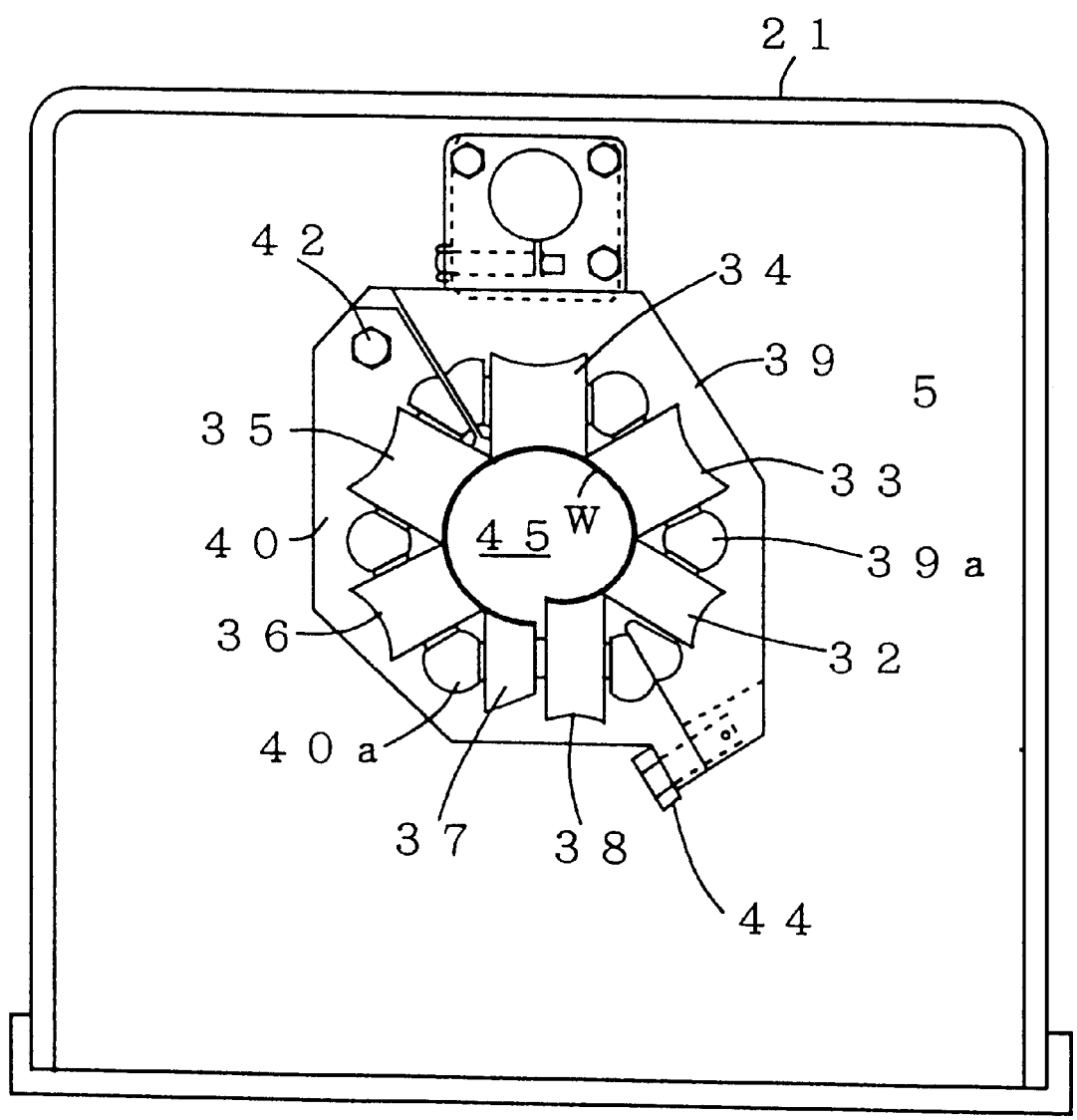
FIG. 6 is a plan view of the intermediate stage molding roller in FIG. 1.
Figure 7:
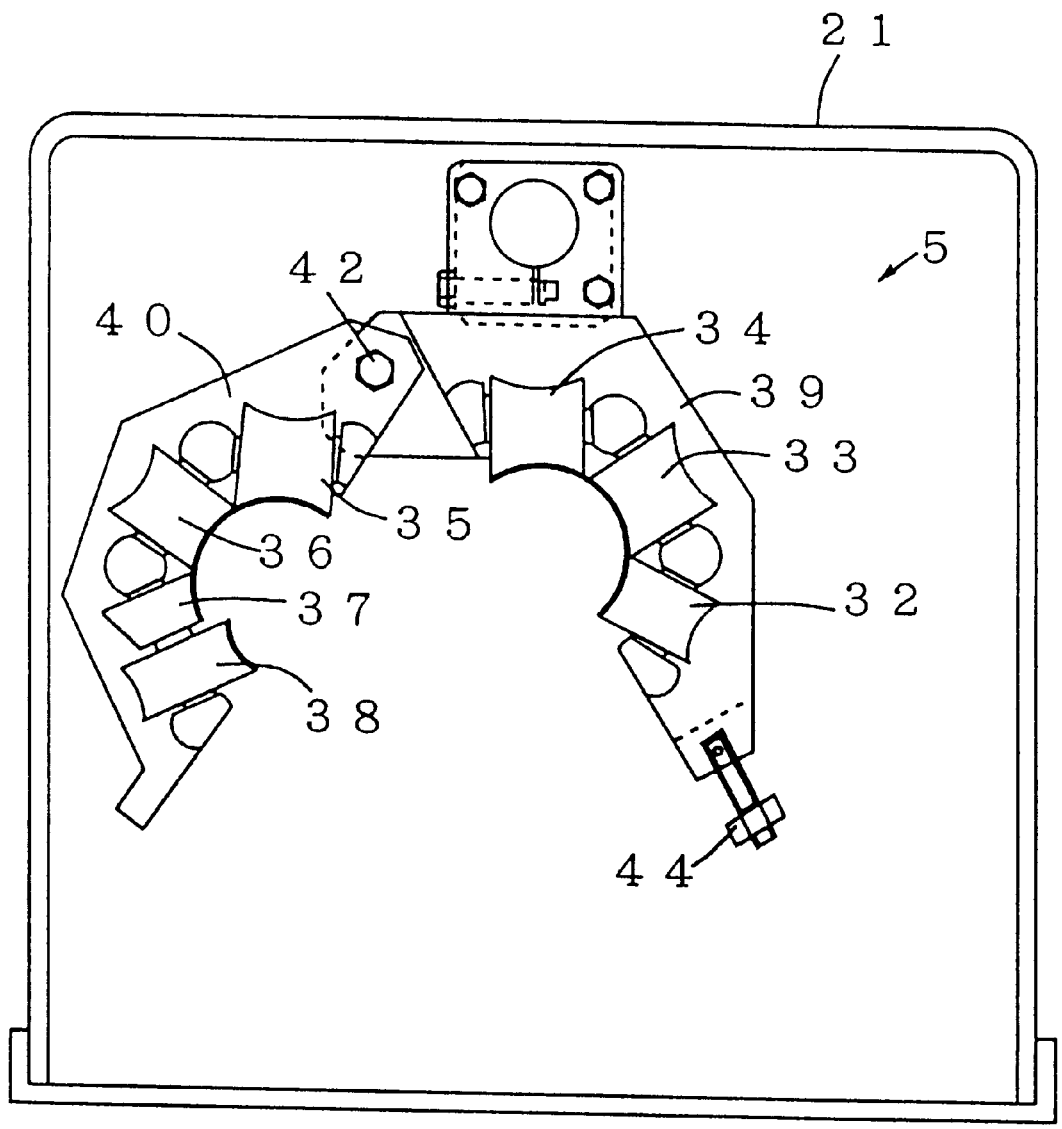
FIG. 7 is a plan view of the intermediate stage molding roller in FIG. 1.

Furthermore, plan views of the intermediate stage molding roller 5 of a tube molding device are shown in FIG. 6 (in a case where the hollow portion 45 through which the web W passes is closed) and FIG. 7 (in a case where the hollow portion 45 through which the web W passes is opened).

The intermediate stage molding roller 5 has seven rollers 32 through 38, and the web W the horizontal section of which is formed to be roughly semi-cylindrical by the upper stage molding roller 4 is made almost completely cylindrical, wherein the end portion of the web W in its width direction is formed so as to overlap on the web W which just passed through the intermediate stage molding roller 5 in order to provide it with a longitudinal sealing.

For this reason, the diameters of the respective rollers 32 through 38 and the roller curvature are set so that the roller surface constituted by the seven rollers 32 through 38 forms an overlapping portion along the back side of the web W at the end portion of the web W in its width direction.

Furthermore, both ends of three rollers 32 through 34 and four rollers 35 through 38 are supported at a rotating axis supporting portion 39a and a rotating axis supporting portion 40a on the respective curved roller supporting plates 39 and 40. Subsequently, one end of a pair of curved roller supporting plates 39 and 40 is rotatably and detachably engaged at an engaging member 42, and the other end thereof is constructed so as to be engaged and disengaged by a temporary engaging member 44. Therefore, a pair of curved roller supporting plates 39 and 40 form the hollow portion 45, through which the web W passes, by engagement of the engaging member 42 with the temporary engaging member 44. Furthermore, by cancelling the engagement with the temporary engaging member 44 and causing a pair of curved roller supporting plates 39 and 40 to be spaced centering around the engaging member 42, the hollow portion 45 through which the abovementioned web W passes is opened, and in this state, the filling pipe 8 (FIG. 1) of a content can be easily let in and taken out.

A heater nozzle 7 which heats the overlapping portion at both ends of web W in its transferring direction is provided between the intermediate stage molding roller 5 and the lower stage molding roller 6. The heater nozzle 7 is made movable to the operating or non-operating position with respect to the web.

Figure 8:
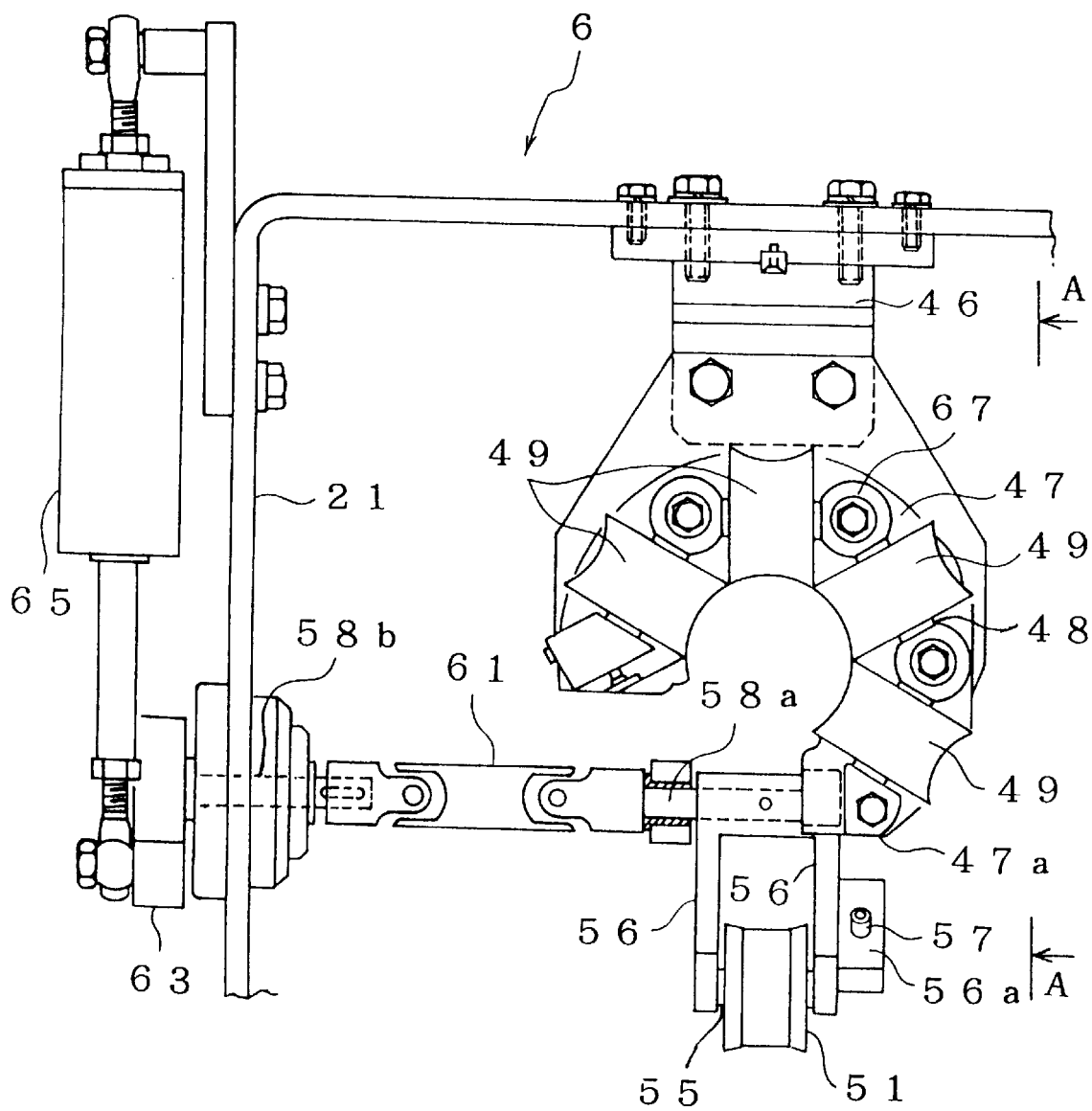
FIG. 8 is a plan view of the lower stage molding roller in FIG. 1.
Figure 9:
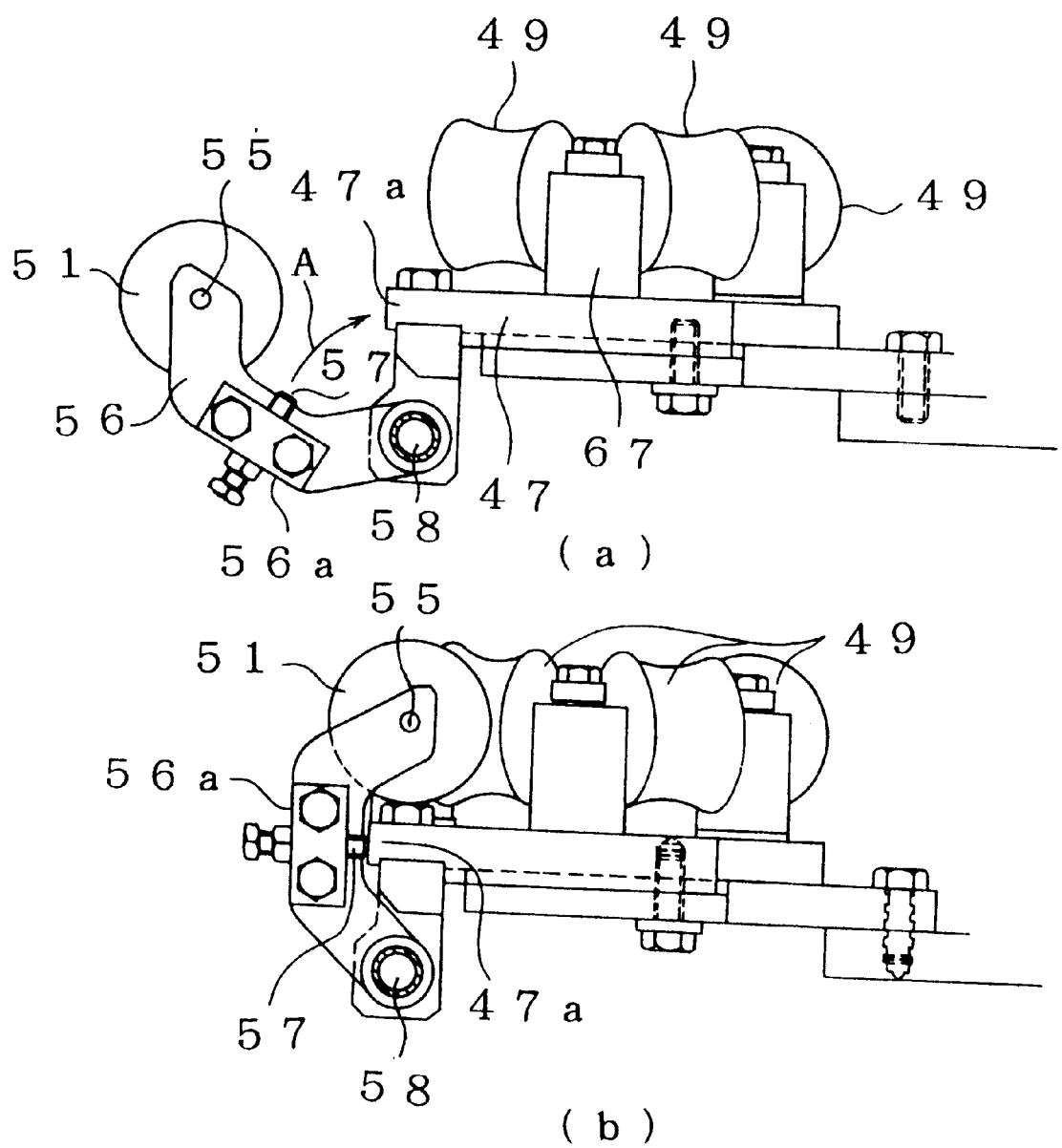
FIG. 9 is a view, showing major parts, which is observed in the direction of the arrows A in FIG. 8.
Figure 10:
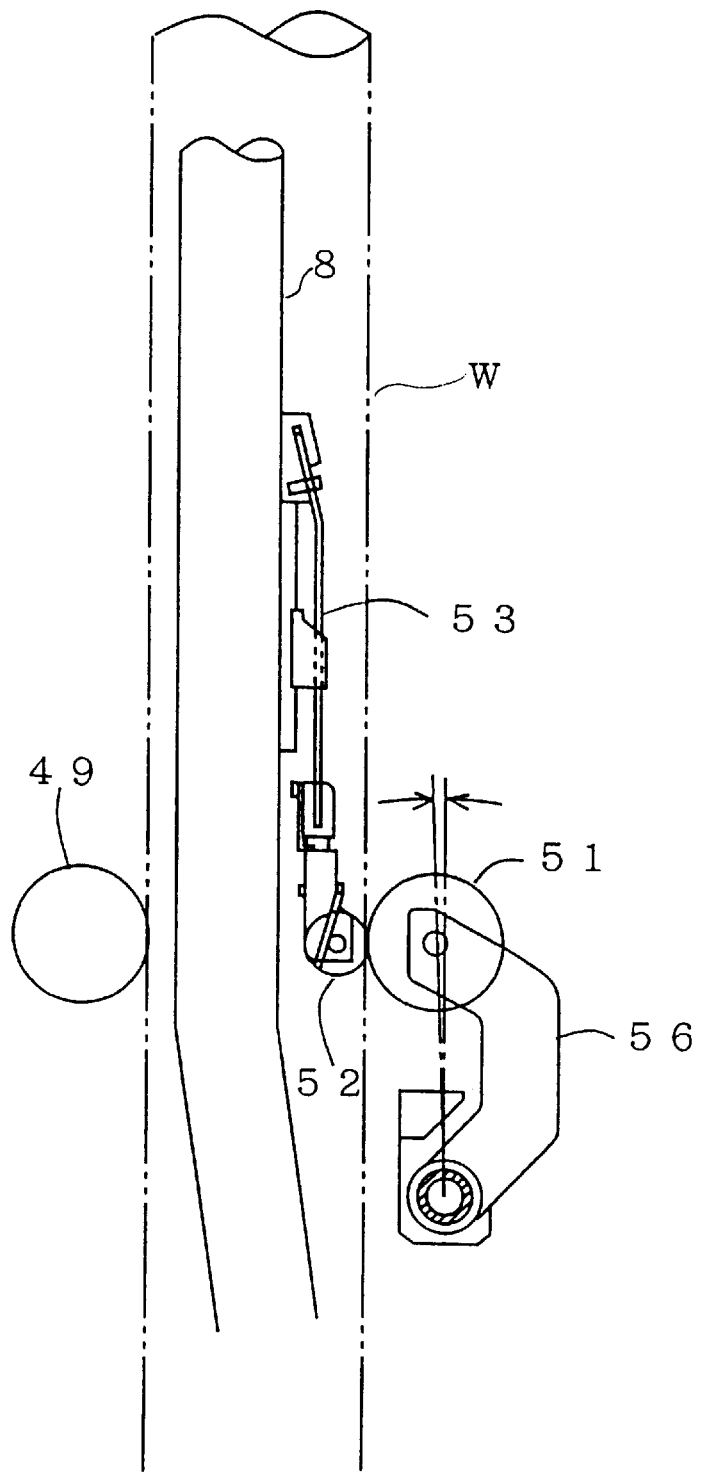
FIG. 10 is a side view when the lower stage molding roller in FIG. 1 longitudinally seals the tubular web.

FIG. 8 shows a plan view of the lower stage molding roller 6, and FIG. 9 shows a view taken along the line A—A in FIG. 8, wherein FIG. 9(a) shows a state where the pressure receiving roller does not carry out a longitudinal sealing of a web (not illustrated), and FIG. 9(b) shows a state where the pressure receiving roller carries out a longitudinal sealing of web (not illustrated). Furthermore, FIG. 10 shows a state where a longitudinal sealing of web is carried out by the pressure receiving roller 51 and compressing roller 52 when the pressure receiving roller 51 is located at a state shown in FIG. 9(b).

The lower stage molding roller 6 is composed of a roller supporting plate 47 supported at a packaging container producing apparatus body via a supporting member 46, five rollers 49 supported at the rotating axis 48 on the abovementioned roller supporting plate 47, and a pressure receiving roller 51 constructed so as to be rotatable by a shaft 58 in the direction of the arrow A in FIG. 9. Furthermore, as shown in FIG. 10, a compressing roller 52 is disposed at a position confronting the abovementioned pressure receiving roller 51 in an internal cylindrical space of a tubular web, and a pressing force toward the pressure receiving roller 51 side is given to the compressing roller 52 by a spring 53.

The pressure receiving roller 51 is supported by a shaft 58 via a bracket 56 to which its rotating axis 55 is attached, and the abovementioned shaft 58 consists of the first shaft 58a and second shaft 58b. The two shafts 58a and 58b connected to each other via a universal shaft joint 61. The second shaft 58b passes through the wall plane 21 of the packaging container producing apparatus body and protrudes outside the apparatus body. The protruding portion of the corresponding second shaft 58b is connected, via a lever 63, to a telescopical cylinder 65 supported at the packaging container producing apparatus body.

Although the pressure receiving roller 51 is disposed at a position shown in FIG. 9(b) while the pressure receiving roller 51 is operating, that is, during a longitudinal sealing of tubular web W, the lever 63 and shafts 58a and 58b are turned, via the universal shaft joint 61, by the telescopical cylinder 65 when the longitudinal sealing of tubular web W is not carried out, and it is possible to move the pressure receiving roller 51 in the opposite direction of the direction of the arrow A in FIG. 9(a)).

Furthermore, as shown in FIG. 8, in the embodiment, a projection 56a is provided at the side face of the bracket 56 for the pressure receiving roller 51, and a fitting plane 47a which is brought into contact with the abovementioned projection 56a is secured at the roller supporting plate 47 of the roller 49 adjacent to the abovementioned pressure receiving roller 51. Furthermore, the fitting position of the projection 56a with respect to the fitting plane 47a is adjusted by a stopper 57 which is provided so as to pass through the projection 56a, consists of a screw member, and has the tip end brought into contact with the abovementioned fitting plane 47a.

Since the pressure receiving roller 51 comes to a stop at the position where the stopper 57 is brought into contact with the fitting plane 47a of the roller supporting plate 47 although the pressure receiving roller 51 is moved by the telescopical cylinder 65 to the position shown in FIG. 9(b) during a longitudinal sealing of the tubular web W, a pressing force of the telescopical cylinder 65 will set up itself against the pressing force of the spring 53 of the compressing roller 52 at the position where the roller 51 is stopped by the stopper 57. Therefore, if the pressing force based on the telescopical cylinder 65 from the pressure receiving roller 51 side sets up itself against the pressing force produced by the spring 53 of the compressing roller 52 (FIG. 10) even though it is made sufficiently great, the compressing force of the compressing roller 52 and pressing force of the pressure receiving roller 51 are able to operate on the web W in a stabilized state at the stop position (the position shown in FIG. 9(b)) of the pressure receiving roller 51 of the stopper 57.

Figure 11:
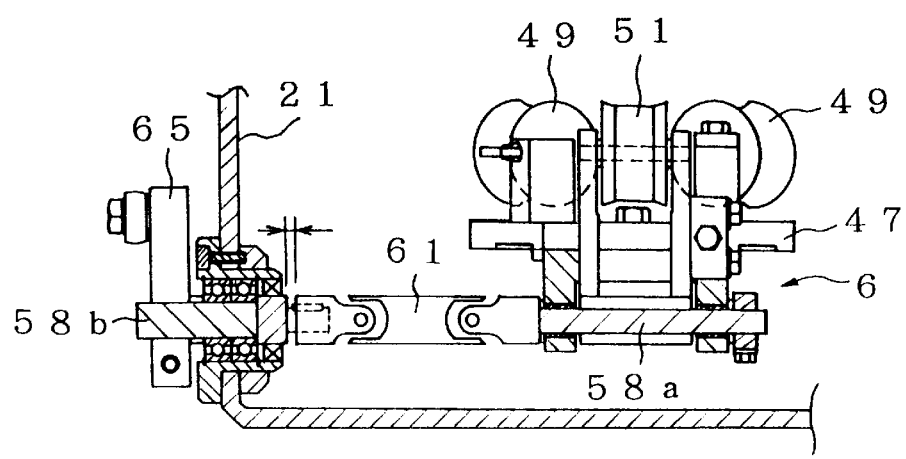
FIG. 11 is a side view explaining the height position adjustment of the lower stage molding roller in FIG. 1 in its vertical direction.
Figure 11:
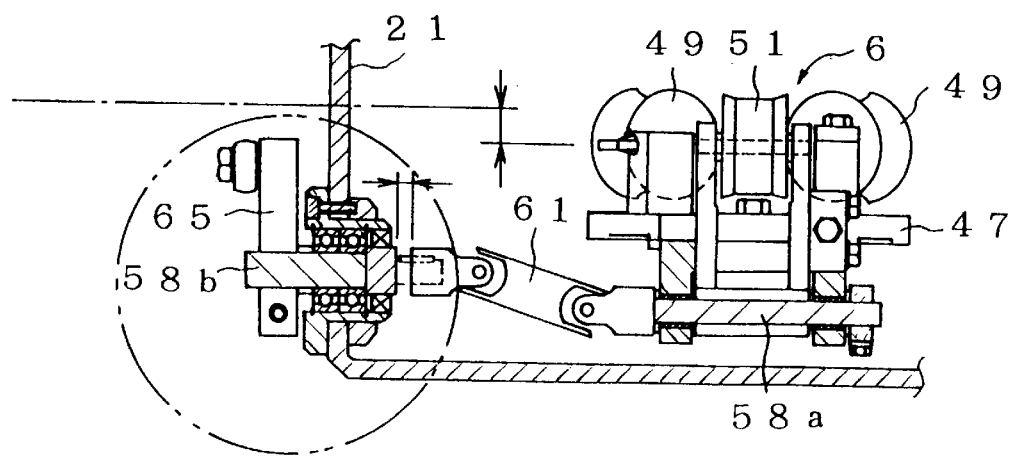
Figure 12:
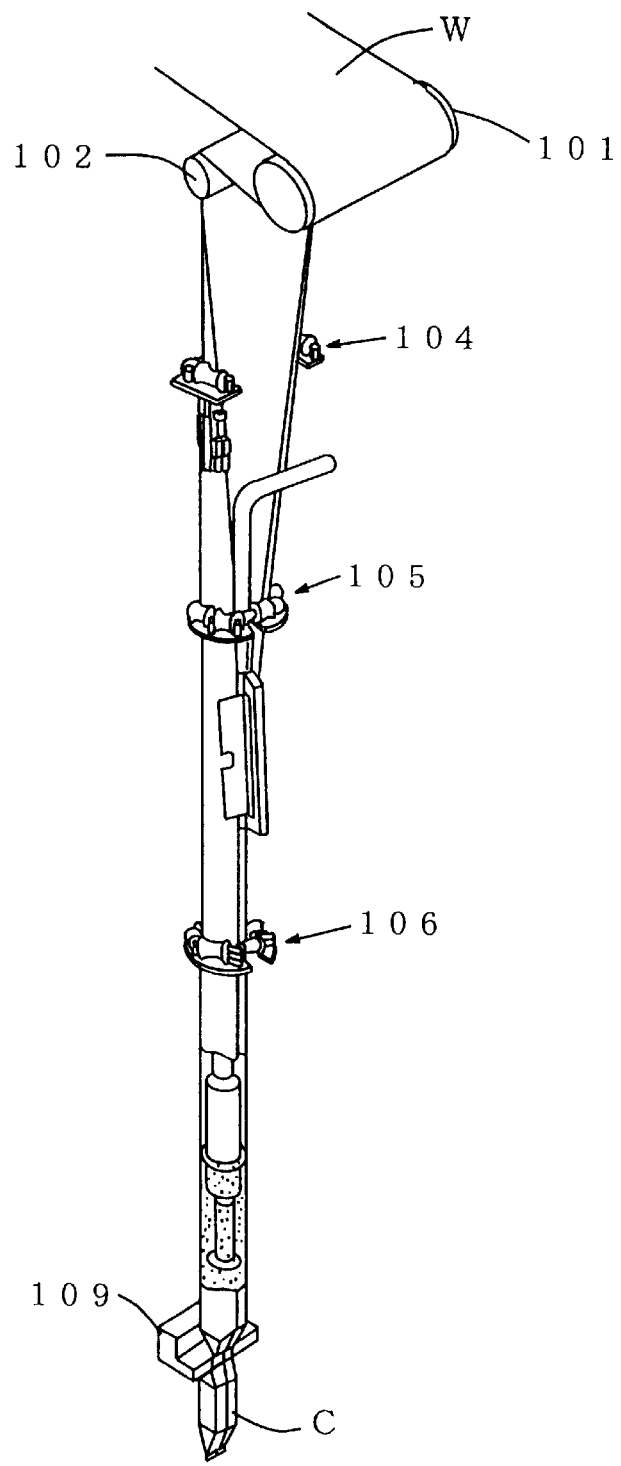
FIG. 12 is a perspective view of a tube molding device of a packaging container producing apparatus according to prior arts.

FIG. 11(a) and FIG. 11(b) are examples in which the height position of the lower stage molding roller 6 of the embodiment in the vertical direction with respect to the wall plane 21 of the apparatus body is adjusted. However, since a shaft joint 61 intervenes between the abovementioned pressure receiving roller 51 and the shaft 58b supported at the wall plane 21 of the apparatus body, it is possible to adjust the position of the lower stage molding roller 6 at a position where the sealing state of the overlapping portion of the tubular web W is optimized, without being regulated by the attaching position of the shaft 58b on the wall plane 21 of the apparatus body.

What is claimed is:

1. A packaging process which comprises molding a plate-like web into a tubular web while feeding the plate-like web along a roller surface formed by a molding roller consisting of a plurality of rollers surrounding said web, sealing said tubular web to form a container, and inserting a fluid into said tubular web, wherein the passing position of the molding roller relative to the web is adjusted in a direction orthogonal to a web feeding direction centering around the hypothetical center axis line of said tubular web which is formed along the roller surface formed by the plurality of rollers surrounding said tubular web.

2. A packaging device which comprises means for molding a plate-like web into a tubular web while feeding the plate-like web along a roller surface formed by a molding roller consisting of a plurality of rollers surrounding said web, means for adjusting the passing position of the molding roller relative to the web being fed in a direction orthogonal to a web feeding direction centering around the hypothetical center axis line of said tubular web which is formed along the roller surface formed by the plurality of rollers surrounding said tubular web, means for sealing said web to form a container, and means for filling a fluid content into said tubular web.

3. A packaging device as set forth in claim 2, wherein the means for adjusting the passing position of the molding roller comprises a supporting member which supports the molding roller, and an adjusting member, connected to said supporting member and supported at the packaging device body, which moves and adjusts the disposing position of the supporting member centering around the hypothetical center axis line of the tubular web.

4. A packaging device as set forth in claim 2, wherein the molding rollers are secured at a plurality of stages in the transferring direction of the web, and the means for adjusting the passing position of the molding roller is provided at at least one of the stages of the molding rollers.

5. A packaging device as set forth in claim 2, wherein the molding rollers are secured at a plurality of stages in the transferring direction of the web, and the means for adjusting the passing position of the molding roller of web is provided at at least the molding roller of the extreme upstream stage.

6. A packaging device as set forth in claim 5, wherein the extreme upstream molding roller stage consists of a plurality of molding rollers, and the molding roller at the middle portion thereof is a barrel type roller.

7. A packaging device as set forth in claim 5, wherein: the extreme upstream stage molding roller in the web transferring direction is provided with a means for adjusting the passing position of the molding roller, a molding roller stage at an intermediate portion of the packaging device consists of a plurality of molding rollers, the molding roller at the intermediate portion is provided with an opening for permitting web to pass therethrough, which is formed by the respective roller surfaces of said plurality of molding rollers;

a structure is provided, by which a structural member of said opening is made openable and closable in order to take out a filling pipe to fill a fluid into a web made tubular by said plurality of molding rollers, and the extreme downstream molding roller stage is provided with a pair of opposing rollers, between which an overlapping portion of the tubular web is transferred and pressed, in order to seal the overlapping portion of the tubular web.

8. A packaging device as set forth in claim 2, further comprising a structure for producing rectangular parallelepiped packaging containers from molded tubes.

* * * * *